United States Patent Office 3,327,593
Patented June 27, 1967

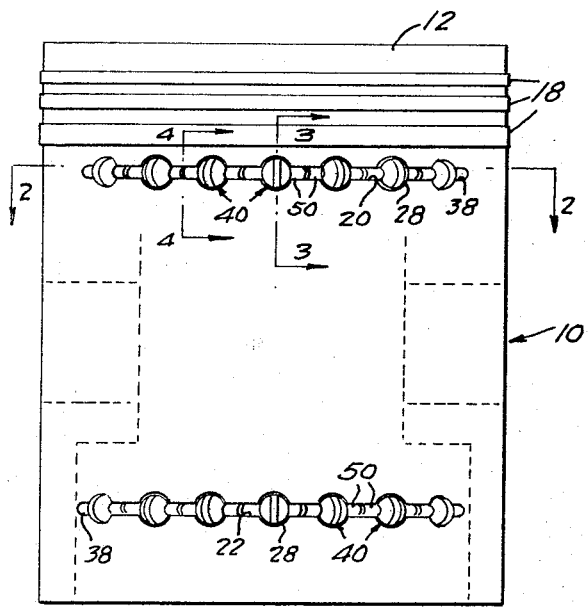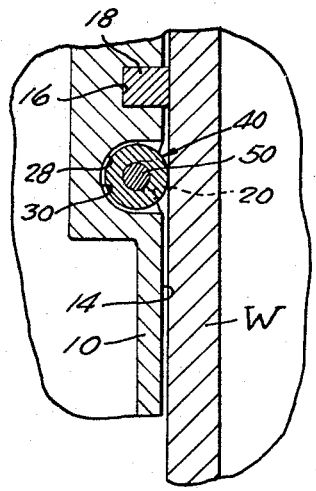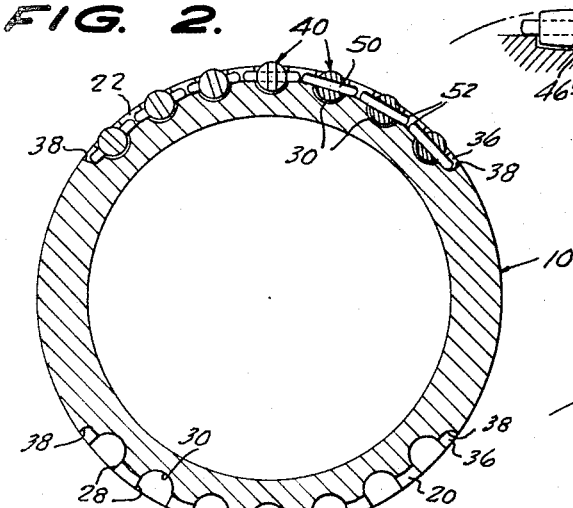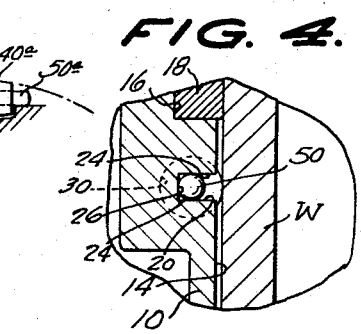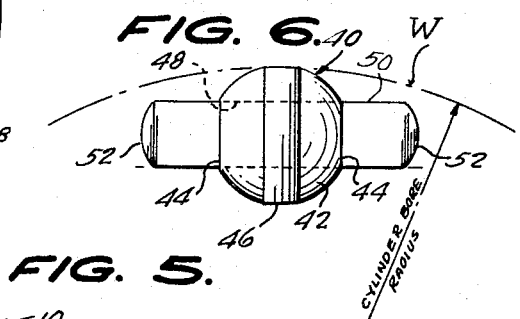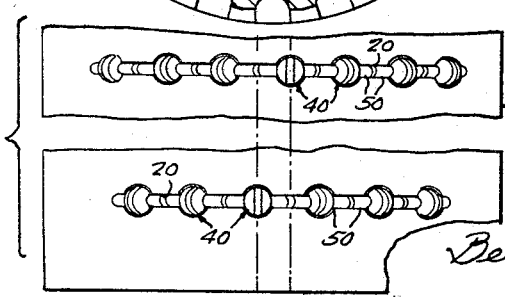

3,327,593
PISTON
Patrick J. Ciaccia, 23 N. Turkey Hill Road,
Westport, Conn. 06880
Filed Dec. 4, 1964, Ser. No. 415,960
1 Claim. (Cl. 92—178)

This invention relates to a piston, having cylinder wall contacting rollers, adapted especially, but not exclusively, for use in internal combustion engines.

The primary object of the invention is the provision of a piston of the kind indicated, which reduces retarding friction between and wear of cylinder wall and piston and its grooves and piston rings and wrist pin and connecting rod and crank shaft bearings, and reduces twisting of the piston and its connecting rod, and thereby enhances durability, produces greater horsepower and smoother performance, reduces fuel consumption and difficulty in cold-weather starting.

Another object of the invention is the provision of a piston of the character indicated above, wherein opposed coplanar rows of rollers are located near the lower end of the piston and between the lower row of rollers and the rings of the piston, the rollers being located in circumferentially spaced enlargements of horizontal grooves formed in the outer surface of the side wall or skirt of the piston, and turning on pins or shafts, the ends of adjacent ones of the shafts being in positioning contact with each other, relative to the roller grooves.

A further object of the invention is the provision of a piston of the character indicated above, wherein the rollers tend to track straight and in the endwise movements of the piston, so that tendencies are eliminated for the piston to twist, thus reducing wear of component parts.

In the drawings:

FIGURE 1 is a side elevation of a piston of the invention;

FIGURE 2 is a horizontal section taken on the line 2—2 of FIGURE 1, rollers being shown positioned in a roller groove, in the upper part of FIGURE 2, and removed from said groove in the lower part of FIGURE 2;

FIGURE 3 is an enlarged fragmentary vertical transverse section taken on the line 3—3 of FIGURE 1;

FIGURE 4 is an enlarged fragmentary vertical transverse section taken on the line 4—4 of FIGURE 1;

FIGURE 5 is a fragmentary and contracted side elevation of another piston, showing the offsetting of rollers, relative to each other;

FIGURE 6 is a diagrammatic view, showing the radius of curvature of the cylinder wall connecting area of a roller as being substantially the same as that of the cylinder wall; and FIGURE 7 is a fragmentary view, like FIGURE 6, showing another form of roller.

Referring to the drawings, the illustrated piston comprises a conventionally cylindrical side wall or skirt 10, closed, at its upper end, by a head 12, the outer surface 14 of the skirt 10 being smooth and unindented, except for piston ring grooves 16, containing piston rings 18, located near the upper end of the skirt 10.

In accordance with the invention, the outer surface 14 of the skirt 10 is indented with opposed rows of coplanar upper and lower rollers grooves 20 and 22, respectively, which, as shown in FIGURE 4, are preferably narrower than the piston ring grooves 16. The pairs of upper roller shaft grooves 20, 22 are located near to and below the piston ring grooves, and the lower roller grooves 20, 22 are located near the lower end of the skirt 10. As shown in FIGURES 2 and 5, the roller shaft grooves 20, 22 each are of a length about one-quarter of the circumference of the piston skirt 10, and are circumferentially spaced, from each other, at substantially similar distances. The grooves 20, 22 have flat parallel sides 24 and flat bottoms 26.

The outer surface 14 of the piston skirt 10 is formed, at equally circumferentially spaced intervals, along the grooves 20, 22, with similar larger cross section substantially cylindrical roller seats 28, which open to these grooves, and extend equally thereabove and therebelow, as indicated in FIGURES 3 and 4.

The roller seats or cavities 28 are substantially deeper than the grooves 20, 22, have concave bottoms 30, normal to the outer surface 14 of the piston skirt 10.

At the ends of each groove 20, 22 are short groove end portions 36, having radial or other shaped outer end walls 38, equivalent, in length, to about half the width of a roller seat 28.

Rollers 40, having diameters slightly greater than the depths of the roller cavities 28 are spacedly engaged therein. The rollers 40 comprise spherical bodies 42, having flat parallel ends 44. The peripheral surfaces of the bodies 42 are formed with centered circumferential, convex cylinder wall contacting surfaces 46, which, as shown in FIGURE 6, have the same radius of curvature as the related cylinder wall W.

The rollers 40 are formed with axial bores 48 and turn on shafts 50, extending through the bores 48 and reaching for equal distances beyond the ends of the rollers, and engaged in the shaft grooves 20, 22. The ends of the shafts 50 are preferably rounded, as indicated at 52.

The ends 52 of the shafts 50, of adjacent rollers 40, may be in contact with each other, except as to the outer ends of the shafts of the end rollers. In the latter case, the end walls 38 of the groove end portions 36 restrict the outer ends of these shafts. The end engagements of the shafts 50 prevent the shafts from shifting endwise out of their position relative to the rollers.

As shown in FIGURE 5, the roller cavities 28, and hence, the rollers 40, are in staggered relationship, along the grooves 20 and 22, so that, as the piston operates, contact of the rollers with the cylinder wall W, of the rollers in the two opposed rows, and accompanying wear, are distributed over the wall W, instead of being tracked and duplicated.

FIGURE 7 shows another form of roller 40a wherein the contacting surface 46a extends to the ends of the roller, and has the same radius of curvature as the cylinder wall.

What is claimed is:

In a cylindrical piston having a head and a skirt and means formed within said skirt for engaging a wrist pin on an axis normal to the axis of said skirt and said skirt having ring grooves formed therein below said head and above said wrist pin engaging means, the improvement comprising: said skirt having a pair of coplanar grooves formed on opposite sides of said skirt above the axis of said wrist pin; a second pair of coplanar grooves similarly placed below the axis of said wrist pin, the grooves of each pair occupying substantially a quadrant of said skirt, said quadrants being centered in a vertical plane containing the axis of the wrist pin; a plurality of antifriction rolling elements individually journaled in each of said grooves, and the grooves of each pair being substantially equally spaced above and below the axis of said wrist pin engaging means.

References Cited
UNITED STATES PATENTS

| | | | |
|---|---|---|---|
| 484,947 | 10/1892 | Black | 308—6 |
| 712,901 | 11/1902 | Black | 308—6 |
| 1,906,765 | 5/1933 | Purkey | 92—178 |
| 2,330,154 | 9/1943 | Stabinski | 308—6 |
| 2,712,483 | 7/1955 | Ciaccia | 92—178 |
| 2,830,409 | 4/1958 | Northcutt | 51—50 |
| 2,883,244 | 4/1959 | Berger | 308—6 |
| 2,889,180 | 5/1959 | Jorgensen | 308—6 |
| 2,992,048 | 7/1961 | Longhurst | 308—6 |

FOREIGN PATENTS

| | | |
|---|---|---|
| 1,031,490 | 6/1953 | France. |

MARTIN P. SCHWADRON, *Primary Examiner.*

G. N. BAUM, *Assistant Examiner.*